(12) United States Patent
Li et al.

(10) Patent No.: US 8,259,012 B2
(45) Date of Patent: Sep. 4, 2012

(54) SOFTWARE GNSS RECEIVER FOR HIGH-ALTITUDE SPACECRAFT APPLICATIONS

(75) Inventors: Rongsheng Li, Hacienda Heights, CA (US); Kamran Ghassemi, Orange, CA (US); Clifford W. Kelley, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 151 days.

(21) Appl. No.: 12/760,294

(22) Filed: Apr. 14, 2010

(65) Prior Publication Data

US 2011/0254734 A1  Oct. 20, 2011

(51) Int. Cl.
*G01S 19/37* (2010.01)
(52) U.S. Cl. .................................. 342/357.77
(58) Field of Classification Search .............. 342/357.77
See application file for complete search history.

(56) References Cited

U.S. PATENT DOCUMENTS

| | | |
|---|---|---|
| 4,445,118 A | 4/1984 | Taylor |
| 5,319,374 A | 6/1994 | Desai et al. |
| 5,365,450 A | 11/1994 | Schuchman |
| 5,594,454 A | 1/1997 | Devereux et al. |
| 5,752,218 A | 5/1998 | Harrison et al. |
| 5,786,773 A | 7/1998 | Murphy |
| 5,809,064 A | 9/1998 | Fenton et al. |
| 5,812,087 A | 9/1998 | Krasner |
| 5,901,183 A | 5/1999 | Garin et al. |
| 5,945,944 A | 8/1999 | Krasner |
| 5,968,106 A | 10/1999 | DeVlieg et al. |
| 5,995,043 A | 11/1999 | Murphy |
| 6,072,524 A | 6/2000 | Davis et al. |
| 6,178,363 B1 | 1/2001 | McIntyre et al. |
| 6,182,927 B1 | 2/2001 | Galvin |
| 6,298,289 B1 | 10/2001 | Lloyd et al. |
| 6,508,438 B2 | 1/2003 | Eyerly |
| 6,516,021 B1 | 2/2003 | Abbott et al. |
| 6,549,829 B1 | 4/2003 | Anderson et al. |
| 6,608,589 B1 | 8/2003 | Devereux et al. |
| 6,654,685 B2 | 11/2003 | McIntyre |

(Continued)

FOREIGN PATENT DOCUMENTS

EP  0604404 A  6/1994

(Continued)

OTHER PUBLICATIONS

Luke M B Winternitz et al: "A GPS Receiver for High-Altitude Satellite Navigation", IEEE Journal of Selected Topics in Signal Processing, IEEE, US, vol. 3, No. 4, Aug. 1, 2009, pp. 541-556, XP011264301, ISSN: 1932-4553.

(Continued)

*Primary Examiner* — Harry Liu
(74) *Attorney, Agent, or Firm* — Ostrager Chong Flaherty & Broitman P.C.

(57) ABSTRACT

A system that provides GPS-based navigation/orbit determination capabilities for high-altitude spacecraft. The system uses an existing spacecraft processor and an easy-to-space-qualify minimum-hardware front end to minimize the need for new space-qualified hardware. The system also uses coherent integration to acquire and track the very weak GPS signals at high altitudes. The system also uses diurnal thermal modeling of a spacecraft clock and precision orbit propagation to enable longer coherent integration, a special Kalman filter to allow weak signal tracking by integrated operation of orbit determination and GPS signal tracking, and a segment-by-segment, post-processing, delayed-time approach to allow a low-speed spacecraft processor to provide the software GPS capability.

22 Claims, 3 Drawing Sheets

U.S. PATENT DOCUMENTS

| | | |
|---|---|---|
| 6,724,343 B2 | 4/2004 | Asher et al. |
| 6,781,542 B2 | 8/2004 | Hoven et al. |
| 6,859,170 B2 | 2/2005 | Devereux et al. |
| 6,859,725 B2 | 2/2005 | Challoner et al. |
| 7,042,392 B2 | 5/2006 | Whelan et al. |
| 7,089,018 B2 | 8/2006 | Galetti |
| 7,131,145 B2 | 10/2006 | Ng et al. |
| 7,269,429 B2 | 9/2007 | Galetti |
| 7,299,113 B2 | 11/2007 | Parlini |
| 7,307,585 B2 | 12/2007 | Hinnant, Jr. et al. |
| 7,349,684 B2 | 3/2008 | Galetti |
| 7,365,674 B2 | 4/2008 | Tillotson et al. |
| 7,372,400 B2 | 5/2008 | Cohen et al. |
| 7,397,422 B2 | 7/2008 | Tekawy et al. |
| 7,492,314 B2 | 2/2009 | DiEsposti et al. |
| 7,542,848 B2 | 6/2009 | Ho |
| 7,548,199 B2 | 6/2009 | Winternitz et al. |
| 7,579,984 B2 | 8/2009 | Wang et al. |
| 7,579,986 B2 | 8/2009 | DiEsposti |
| 2003/0201934 A1* | 10/2003 | Asher et al. ............. 342/357.12 |
| 2006/0082496 A1 | 4/2006 | Winternitz |
| 2006/0114984 A1 | 6/2006 | Gaal et al. |
| 2008/0316095 A1 | 12/2008 | Murakami |
| 2009/0182502 A1 | 7/2009 | Riter |
| 2009/0278736 A1 | 11/2009 | Cohen et al. |

FOREIGN PATENT DOCUMENTS

| | | |
|---|---|---|
| EP | 1538454 A1 | 6/2005 |
| EP | 1798564 A2 | 6/2007 |
| WO | 00/49738 A1 | 8/2000 |
| WO | 01/75470 A1 | 10/2001 |

OTHER PUBLICATIONS

Tsiaki M L: "Block Acquisition of weak GPS signals in a software receiver", Proceedings of the Institute of Navigation (ION) GPS, XX, XX, Sep. 11, 2001, pp. 1-13, XP002339506.

International Patent Application PCT/US2011/028392, Filed Mar. 14, 2011, International Search Report, dated Jun. 7, 2011.

Ioannides et al., Coherent Integration of Future GNSS Signals, ION GNSS 2006.

Amini et al, Design and Implementation of a Space Environment Simulation Toolbox for Small Satellites, 56th International Astronautical Congress 2005, 35th Student Conference (IAF W.).

* cited by examiner

SOFTWARE GNSS RECEIVER FOR HIGH-ALTITUDE SPACECRAFT APPLICATIONS

BACKGROUND

This invention generally relates to radio navigation/communications, and more particularly relates to software GNSS receivers.

Global Navigation Satellite Systems (GNSS) is the standard generic term for satellite navigation systems that provide autonomous geo-spatial positioning with global coverage. GNSS allows an electronic receiver to determine its location (longitude, latitude and altitude) to within a few meters using time signals transmitted along a line-of-sight from satellites. The global coverage is achieved by constellations of medium Earth orbit (MEO) satellites in different orbital planes.

The United States NAVSTAR Global Positioning System (GPS) is a GNSS. GPS receivers are currently in widespread use for navigation and other related applications. Basically, a GPS receiver can determine its location by analyzing radio signal information received from GPS satellites orbiting the earth.

Generally, GPS signal processing can be divided into two major tasks: signal acquisition (or detection) and then signal tracking (and demodulation). Signal acquisition is the process of finding a GPS signal within a two-dimensional unknown parameter space. Signal tracking is the process of continuously updating the estimates of these two and other signal parameters. Signal acquisition is generally a more difficult process than signal tracking.

A GPS receiver is an autonomous instrument that transforms signals from GPS satellites into point solutions for spacecraft navigation. Current GPS receivers have a radio frequency section for receiving and converting signals received from a spacecraft's antennas. The digitized signals are then forwarded to one or more correlators, controlled by the receivers own processor. The correlators look for matches between the incoming signal and the corresponding code for different satellites. When a satellite lock occurs, or the incoming signal matches an internally generated pseudo random noise (PRN) code (often called "a code replica"), the receiver's processor is notified. The processor contains executable code to generate a pseudo-range or a line-of-sight distance to the satellite. The processor may also contain the executable code of an orbit propagator. An orbit propagator autonomously generates estimates of position, velocity and time. The pseudo-range is a measurement input to the navigation filter that calculates point solutions for determining the orbit of the spacecraft. Such GPS systems may be employed to position and track an orbiting moving body.

The theory and practice of satellite orbit prediction and determination is disclosed in a book entitled "Satellite Orbits: Models, Methods and Applications," by Montenbruck and Gill, Springer-Verlag, Berlin, Heidelberg, N.Y., $1^{st}$ Ed. (2000), the contents of which is incorporated by reference herein in its entirety. Starting from the basic principles of orbital mechanics, the book covers elaborate force models as well as precise methods of satellite tracking. Emphasis is on numerical treatment and a multitude of algorithms adopted in modern satellite trajectory computation are described.

A GPS receiver receives ranging signals broadcast from the constellation of GPS satellites. These ranging signals (e.g., the L1 carrier frequency) are Binary Phase Shift Key (BPSK) modulated. The modulation consists of two components that are modulo-2 summed: (1) a 1.023 MHz (in the case of the L1 carrier) Pseudo-Random Noise (PRN) code, such as the coarse acquisition (C/A) code; and (2) a 50 Hz navigation message. The C/A code sequence repeats every 1 msec. The GPS receiver demodulates the received code from the carrier, and detects the time offset between the received code and a locally generated replica of the code. The receiver also reconstructs the navigation message data. As is well known, the navigation messages include ephemeris data, used to calculate the position of each satellite in orbit, and information about the time and status of the entire satellite constellation, called the almanac.

To compute spacecraft position, velocity and time, the navigation system determines the pseudo-range to four or more GPS satellites in track. The propagation time to each GPS satellite is obtained by determining the difference between transmit and receipt times of the code. The pseudo-range to each GPS satellite is computed by multiplying each propagation time measurement by the speed of light (represented by "c" in the Appendix hereto).

The navigation message transmitted from each GPS satellite provides data which are required to support the position determination process. That includes information to determine satellite time of transmission, satellite position, satellite health, satellite clock correction, time transferred to UTC, and constellation status.

The signal processing and analyzing functions of a GPS receiver can be relatively complex and until recently were generally performed by customized processing hardware, such as application specific integrated circuits (ASICs). As such, a typical hardware-oriented GPS receiver can become incompatible with next generation communications technology, and may require costly upgrading or replacement or integration with other devices. In addition, hardware-oriented GPS receivers used in harsh environments, such as in military applications, typically require an extensive support system to maintain reliable component operation.

Recent efforts to overcome these disadvantages have led to the development of software GPS receivers, where an embedded GPS application program (running on a general purpose processor) can provide signal processing and analysis functionality previously performed by hardware. In the event of a change in GPS satellite signal standards, for example, a software GPS receiver can be reconfigured with up-to-date software to accommodate the new satellite signal with little or no impact on the receiver hardware.

Conventional (GPS) receivers are generally not readily capable of operating effectively at altitudes above low Earth orbits (LEO), namely, geostationary Earth orbits (GEO) or other high-altitude space missions. This is due, in part, to the fact that the GPS signals available at higher altitudes are much weaker and more sparsely present than on Earth or at LEO and the strongest part of the signal is mostly blocked by the earth itself. It is the inadequacy of conventional GPS acquisition and tracking techniques that generally prevent the use of weak signals in GPS receivers.

The generally inadequate (for weak signals) conventional approach is to employ a serial search of the two-dimensional parameter (frequency and time) space during acquisition. Typically, the same hardware that is used in signal tracking is reconfigured to effect the search. During a cold-start, which is a lack of any prior (a priori) information about visible GPS signals, acquisition by serial search can take upwards of 20 minutes for a very strong signal. To acquire weak signals, more data must be examined. Using serial search methods, acquisition times grow quadratically.

U.S. Pat. No. 7,548,199 discloses a fast acquisition/weak signal GPS receiver targeted for high-altitude spacecraft applications which uses radiation-hardened field-programmable gate arrays. There is a need for a software GPS receiver for high-altitude spacecraft applications.

BRIEF SUMMARY

The present invention includes a system that provides GPS-based navigation/orbit determination capabilities for high-altitude spacecraft. The system disclosed herein uses an existing spacecraft processor and an easy-to-space-qualify minimum-hardware front end to minimize the need for new space-qualified hardware. The system also uses coherent integration (also known as "time-domain averaging") to acquire and track the very weak GPS signals at the high altitudes typical of GEO or HEO. The system disclosed herein uses diurnal thermal modeling of a spacecraft clock and precision orbit propagation to enable longer coherent integration; a special Kalman filter to allow weak signal tracking by integrated operation of orbit determination and GPS signal tracking; and a segment-by-segment, post-processing, delayed-time approach to allow a low-speed spacecraft processor to provide the software GPS capability. The system disclosed herein also provides an efficient way of updating and utilizing GPS navigation data ("navdata") that is used to "wipeout" the navdata on the GPS signal to allow long coherent integration.

Other aspects of the invention are disclosed and claimed below.

DETAILED DESCRIPTION

Figure 1:
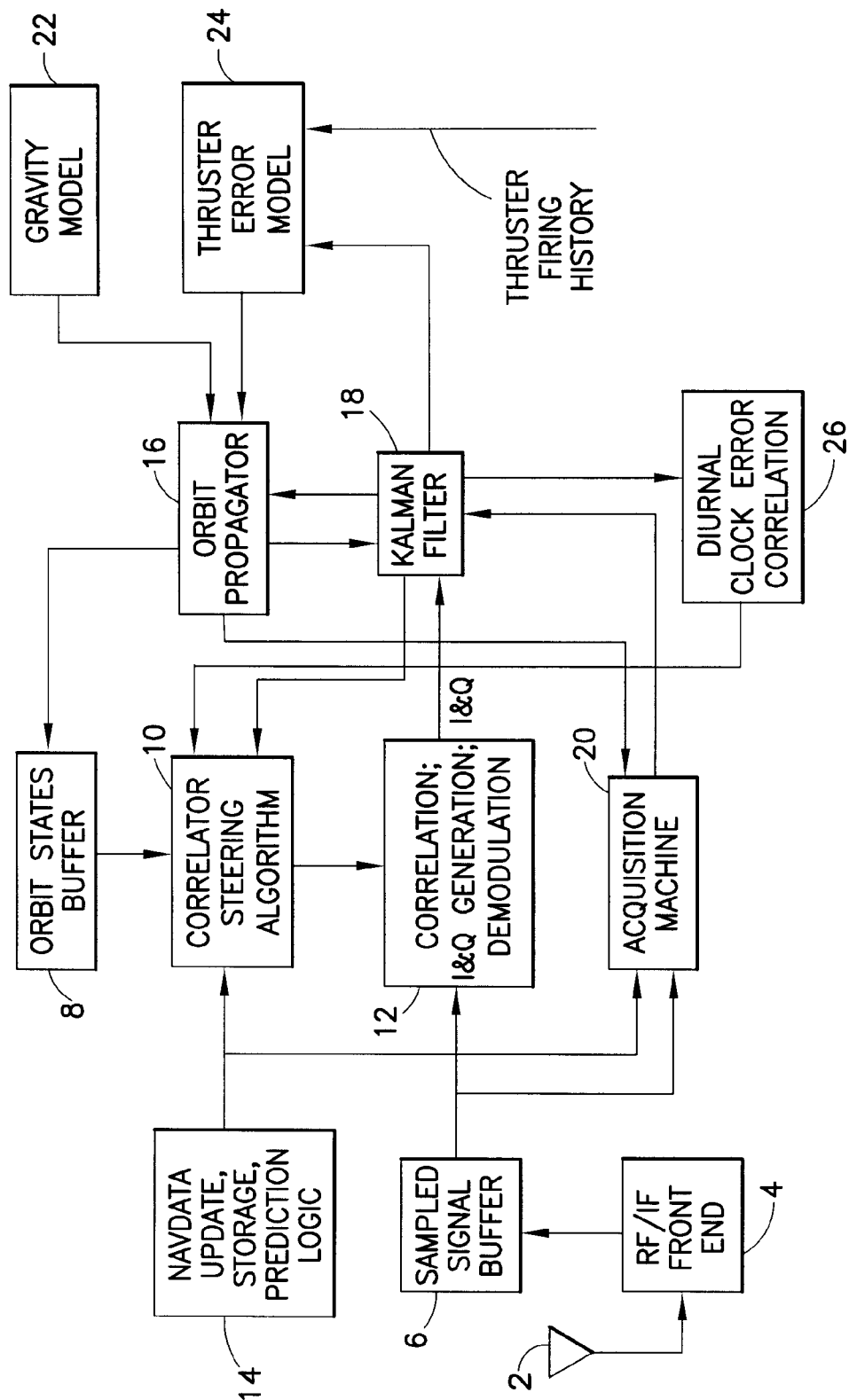
FIG. 1 is a high-level diagram showing components of a system in accordance with one embodiment of the invention. Only items 2 and 4 in FIG. 1 represent hardware components—the other blocks representing various software modules running on a computer processor onboard the user satellite.

A high-altitude GPS orbit determination system in accordance with one embodiment of the invention is depicted in FIG. 1. Analog GPS signals are received by an antenna 2 onboard the orbiting spacecraft. These GPS signals are received by front-end hardware represented by block 4 in FIG. 1. This front-end hardware preferably comprises a single-chip, easily space-qualifiable solution which can be purchased in the open market. Block 4 takes the L-band GPS signal and down converts to the Intermediate Frequency (IF) band (typically a few megahertz). Block 4 then samples the analog signal using an analog-to digital (A/D) conversion at around 4 MHz (for CA code). The output of block 4 is digital data that can be processed by a computer processor onboard the orbiting spacecraft. The design and fabrication of block 4 is well known in the art of GPS.

The sampled signal (i.e., digital) data from block 4 is output to a sampled signal buffer 6, which saves the digital data. Buffer 6 can be implemented by software running on the computer processor. The length of the buffer is dependent on how much processor throughput is allocated for the GPS capability and how large processing delays are. In one embodiment, buffer 6 accumulates 1 second of data (usually in real time).

There are two situations that are of particular interest: (1) real-time processing; and (2) delayed processing. In the case of real-time processing the sampled data is immediately processed to provide a navigation solution. In this case, the computer processor must be fast enough to process the data in real-time. In the case of delayed processing, the sampled data corresponding to a time segment, for example, a 100-msec segment, are stored for delayed processing. In the latter case, the processor is allowed to take its time and reports results after a large time delay (such as 15 minutes). As a result, it is possible to provide the GPS capability for spacecraft orbit determination purposes with virtually no throughput requirement as the processing can be spread over a long period of time.

In accordance with the embodiment disclosed herein, an acquisition machine 20 (i.e., an acquisition algorithm module running on the onboard computer) is used to acquire very weak GPS signals at the high altitudes typical of GEO or HEO in a delayed-processing mode. After the GPS signals have been acquired using the acquisition machine 20, the GPS signals can be tracked in a real-time mode using well-known algorithms, as explained in detail below.

The system also comprises an orbit propagator 16 (well known in the art and disclosed in the book by Montenbruck and Gill, previously incorporated by reference herein). The orbit propagator 16 integrates the acceleration of the spacecraft into velocity and then into position. Most existing orbit determination algorithms simply determine orbit from GPS data. The approach disclosed herein uses precision orbit propagation using a gravity model (known art) and a thruster error model (if the thrusters are fired). Coherent integration of the signal requires the navigation system to precisely predict the position and velocity, and consequently, the code phase, code frequency and carrier intermediate frequency. The precision orbit determination enables this capability.

The acceleration inputs to the orbit propagator 16 are the following: (1) gravitational forces exerted by the Earth, Sun and Moon on the spacecraft; and (2) acceleration generated by thruster firing of the spacecraft. The gravitational forces on the spacecraft are computed using a high-accuracy gravity model (block 22 in FIG. 1), which is software running on the onboard computer processor. The acceleration generated by thruster firing is estimated using a thruster error model (block 24 in FIG. 1), which also is software running on the onboard computer processor. The orbit states are computed by the orbit propagator 16 and maintained in real time.

The relation between the intended thruster force and the actual thruster force is what the thruster error model 24 attempts to model. The specific form of the model depends on the actual thrusters, but the generic mathematical form disclosed in Section 4 of the Appendix encompasses virtually all possibilities.

The system further comprises an orbit states buffer 8 which receives the computed orbit states data from the orbit propagator 16 and buffers that data for the same time period that the sampled signal buffer 6 is buffering the GPS data. The orbit states can be buffered with time stamps in orbit states buffer 8 to allow time-matched processing together with the GPS signals in buffer 6 in a delayed fashion.

During tracking of GPS signals, the orbit states outputted by buffer 8 are processed by a correlator steering algorithm (block 10 in FIG. 1), which is software running on the onboard computer processor. The correlator steering algorithm 10 controls replica signal generation. The correlator steering algorithm 10 uses the following information to control replica signal generation: (1) the buffered orbit position and velocity of the user satellite coming from buffer 8; (2) current knowledge of the time corrected by current knowledge of corrections coming from a diurnal clock error correction software module (block 26 in FIG. 1) which includes a clock error model (the clock error model is described in more detail in Section 3 of the Appendix); (3) position, velocity and clock error of each GNSS satellite, which is predicted by software module 14 in FIG. 1 based on information in the navigation messages received, e.g., from the ground; and (4) an "integer ambiguity" value from the Kalman filter 18. During normal operation (i.e., real-time tracking), the correlator steering algorithm in block 10 produces the predicted carrier intermediate frequency $\omega_j$, the predicted code frequency $\bar{\omega}_j$, and the predicted code phase $\phi_k$, using the currently estimated position and velocity of the user satellite from the orbit propagator 16, position, velocity and clock error of each GNSS satellite from the navigation message, and the clock bias, clock rate and "integer ambiguity" from the Kalman filter 18.

The system further comprises a correlation processing software module 12 which performs correlation, I & G generation and demodulation. More specifically, in well-known manner, the correlation processing module 12 performs baseband digital signal processing as well as signal acquisition and tracking in real-time. The correlation processing module 12 generates a replica signal based on information from the correlator steering algorithm 10 and then correlates the sampled digital GPS signals from buffer 6 with that replica signal. Correlation analysis is used to determine what code phase difference exists between the GPS and replicated PRN codes. The incoming GPS signal is demodulated down to roughly the baseband by multipliers using the corresponding cosine and sine versions of the replica signal to produce I and Q signal components. The resulting I and Q signal components are sent to a Kalman filter 18, which computes the correlation magnitude for each frequency/time point in the search array:

$$(I^2_{j,k}+Q^2_{j,k})^{1/2}$$

As previously explained, the acquisition performs similar computations, but in a delayed processing mode, not in a real-time processing mode. The acquisition machine comprises a correlator steering algorithm (similar to block 10 in FIG. 1), software correlator processing for generating averaged I and Q signal components (similar to block 12 in FIG. 1), an algorithm for computing correlation magnitudes for each frequency/time point in a search array (similar to an algorithm in the Kalman filter 18), and an algorithm for computing lower-accuracy versions of the pseudo-range and pseudo-range rate for each GNSS satellite whose GPS signals have been acquired. The acquisition machine 20 then sends those pseudo-ranges and pseudo-range rates to the Kalman filter 18. The Kalman filter then uses that information to update the position and velocity estimates, which leads to corrections to the orbit state and to the clock bias and rate. The foregoing corrections are sent by the Kalman filter to the orbit propagator 16.

Figure 3:
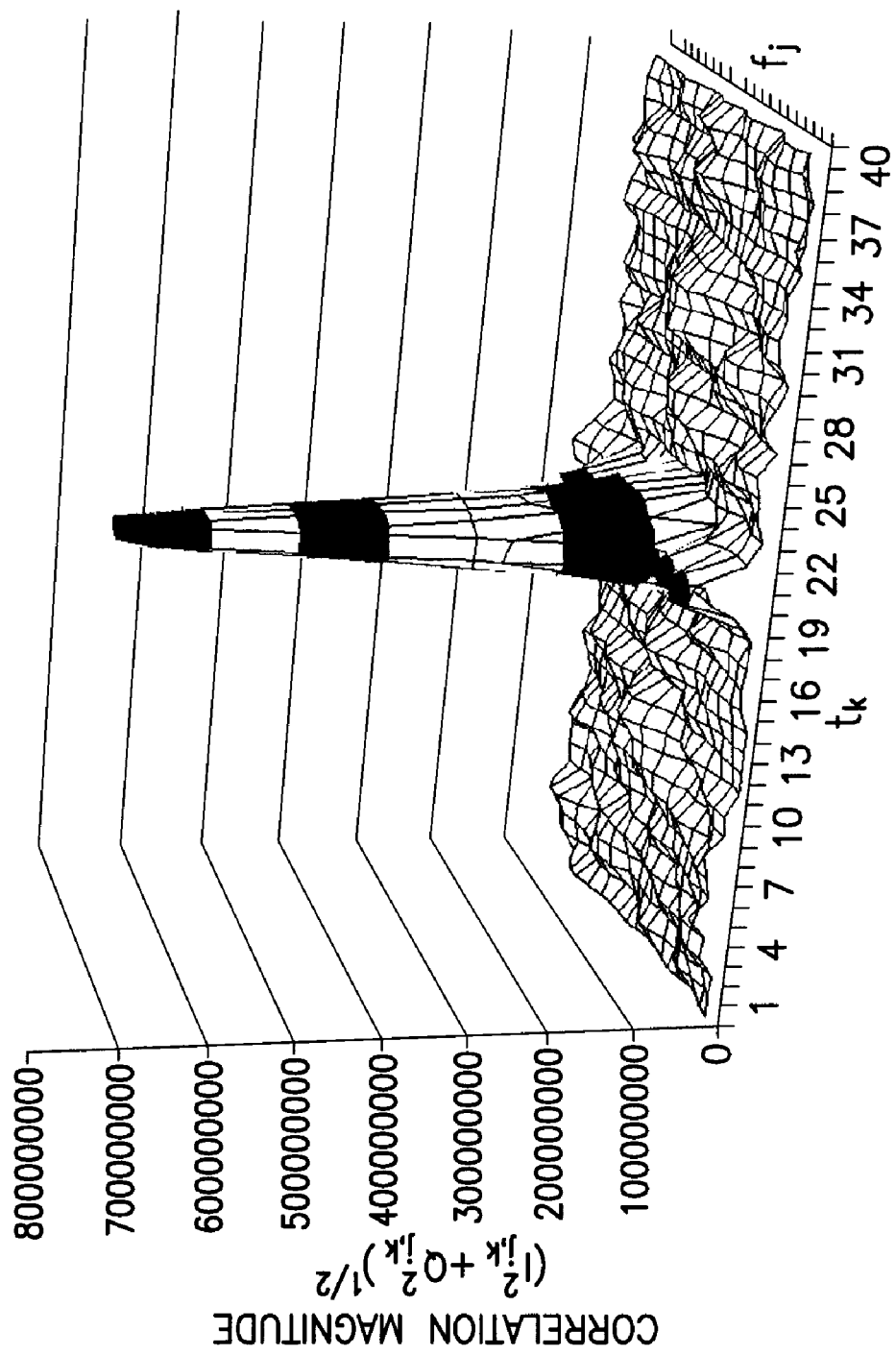
FIG. 3 is a three-dimensional graph showing exemplary correlation magnitudes for a two-dimensional search over an array of frequency/time points. The spike indicates that the receiver of the user satellite has found a signal from a GNSS satellite at that time and frequency.

Equations representing the computations performed by the correlator steering algorithm are given in Section 1 of the Appendix. Equations representing the computations performed during correlation processing are given in Section 2 of the Appendix. The graph in FIG. 3 shows one example in which the correlation magnitude has been calculated by the acquisition machine for a search array of frequency/time points. The spike indicates that the receiver of the user satellite has found a signal from a GNSS satellite at the corresponding time and frequency.

The replica signal is generated by the acquisition machine 20 using the predicted code frequency, predicted code phase (pseudo-range) and predicted carrier intermediate frequency from the correlator steering algorithm. In addition, the replica signal is modulated with the navigation data information which is based on current knowledge of navigation data coming from block 14 to allow extended coherent integration by the acquisition machine 20.

As is well known in the art, the CA code is modulated on top of the carrier, and the navdata is modulated on the top of the CA code. The navdata bit changes its value every 20 msec (50 bits/sec); consequently, if one were to integrate the correlation results beyond 20 msec, it means integrating across the boundary of at least 2 navdata bits. Consequently, the integration results would not be correct because of the change in the navdata bits during the integration.

However, the navdata from the incoming signal can be removed using the navdata from other sources (e.g., uploaded from ground or received earlier) with the addition of reasonable time knowledge (so that it is known when the navdata bit changes). By doing that, the integration is no longer affected by the change in the navdata bits. This technique is well known in the art. The use of known navigation data (navdata) in the replica signal generation is known as "data wipe-out" because the multiplication of the generated navdata bits with the incoming navdata bits has the effect of wiping out the navdata. The result is such that the system is not bounded by the maximum integration period of 20 msec during which the navdata bits remain constant. Integrating for longer times means the system will be able to detect weaker GPS signals.

Block 14 maintains the navigation data bits which can come from the following sources: (1) saved when there is strong GPS signal (for example, signal from the main lobe of the antenna pattern); (2) uploaded by equipment on the ground; (3) provided by assistance/augmentation services such as TDRS; or (4) predicted using the current data (a known art).

The acquisition machine 20 also accumulates (or coherently integrates) the correlation results to provide an enhanced signal-to-noise ratio. This allows the very weak signals at high altitude from the side-lobe of the GPS space vehicle antenna 2 to be detectable.

As previously mentioned, the system comprises a Kalman filter 18, which is also software running on the onboard computer processor. During real-time tracking, the Kalman filter 18 receives I and Q signal components from the correlation processing module 12 and also receives inputs from the orbit propagator 16. During delayed processing, the Kalman filter receives pseudo-ranges and pseudo-range rates from the acquisition machine 20. The generic equations for the Kalman filter 18 are well known in the art. The specific Kalman filter design of the disclosed embodiment of the present invention can be described by identifying the states of the Kalman filter and the associated state transition matrix ("A matrix" or "PHI matrix") and measurement matrix ("H matrix").

The Kalman filter 18 has the following states: (1) orbit position errors (a 3×1 vector); (2) orbit velocity errors (a 3×1 vector); (3) thruster model parameter errors (depending on thruster type, can be one scale factor parameter per thruster); (4) gravity model parameter errors (typically just a gravity bias); (5) spacecraft clock bias and clock rate and clock error model parameter errors (typically two states); and (6) a floating point version of the GPS carrier-phase Integer Ambiguity (one state for each tracked space vehicle).

The formulation of key matrices for the specific Kalman filter design is described in Section 5 of the Appendix. The linearized state transition equation set forth in the Appendix is used in the standard Kalman filter equations for covariance propagation. The Kalman filter receives the I and Q signal components and updates the parameter states. The Kalman filter 18 then feeds back estimated corrections to the orbit propagator 16, the thruster error model 24 and the clock error model 26, allowing the entire system to work together for the best performance in a synergistic manner.

Both the correlation processing module 12 and the acquisition machine 20 calculate the I and Q signal components using the equations set forth in Section 2 of the Appendix. The correlation processing module 12 performs those operations in a real-time mode (one value at a time), outputting the I and Q signal components to the Kalman filter 18, which converts the I and Q signal components into pseudo-ranges. The pseudo-range calculations use the signals of four satellites to compute the location and the clock error of the user satellite in a well-known manner. In particular, the time when the signal from a GNSS satellite was received (i.e., the spike seen in FIG. 3) is subtracted from the time when the signal was transmitted by the GNSS satellite, the resulting difference being multiplied by the speed of light to get the range in a well-known manner.

In a delayed processing mode, the acquisition algorithm 20 processes a series of signal samples acquired over a previous time interval (e.g., 1 sec) and generates pseudo-ranges and pseudo-range rates, which are sent to the Kalman filter. (While operating in the delayed processing mode, the correlation processing module 12 is not operating in the real-time mode.)

In either the real-time or the delayed-processing mode, the I and Q values are calculated for a search array of frequency/time data points received from the sampled signal buffer 6. Typically, the correlation processing module 12 perform a two-dimensional search using three time entries and one frequency entry. In contrast, in the delayed processing mode, the acquisition machine 20 searches an array of frequency/time data points having far greater numbers of time and frequency entries. For example, the search time array $t_k$ may have 2,000 entries (i.e., k=−1,000 to +1,000 half-chips, where 1 half-chip=½ µsec=500 nsec), while the search frequency array $f_j$ has 100 entries separated by 400 Hz. The search results are the I and Q signal components for every frequency/time point in a two-dimensional array.

The PRN is a function of time. The receiver disclosed herein creates a replica of a PRN and then multiplies that replica by the incoming signal. When the replica and the incoming signal are aligned, the correlation magnitude will get a large spike at a particular time and frequency, as seen in FIG. 3. If the peak of the spike in the correlation magnitudes is not in the middle, then there is an error and the deviation is sent to the Kalman filter 18. The acquisition machine 20 coherently integrates the GPS signal data from buffer 6. The acquisition machine 20 also determines the pseudo-ranges and pseudo-range rates from the user spacecraft to the GPS satellites by searching within the range of uncertainty against the received GPS signal. The acquisition machine determines the pseudo-range and pseudo-range rate by searching in the two-dimensional space of time delay (which translates to pseudo-range) and Doppler frequency (which translates to pseudo-range rate). The orbit propagator 16 provides orbit information to the acquisition machine 20, which is used by the latter to provide the "center point" for the search range during acquisition searches. The acquisition processing is used in the following two situations: (1) before the system is able to track the GPS signals; and (2) when the decision has been made to spare a very small portion of processor throughput, the coherently integrated GPS signals are processed (segment by segment) in a long-delayed manner (1 hour, for example) and the acquisition results are sent to the Kalman filter, which uses them to update the state of the orbit propagator.

Since the position of the user satellite is predictable, the onboard system needs to correct for errors, i.e., operate in the delayed processing mode, only every few, e.g., two, hours. In accordance with one embodiment, the GPS signal data acquired during a 1-sec interval is buffered; then signal data acquisition is stopped. The acquisition algorithm can be implemented on a slow computer since a fix is needed only every 2 hours. The purpose of the sampled signal buffer 6 (see FIG. 1) is to allow accumulation of data samples over the predetermined (e.g., 1 sec) time interval. The large sample of data points enables the acquisition algorithm to perform coherent integration to acquire and track the very weak GPS signals at GEO or HEO.

Given the periodic Sun exposure of the spacecraft in a regular fashion, the clock errors typically exhibit periodic behavior as well. The system disclosed herein takes advantage of this fact to achieve better performance. Specifically, the system uses the clock error model disclosed in Section 3 of the Appendix. There is no clock error term in the equations for the correlator steering algorithm (see Section 1 of the Appendix) as it is contained in the search time $t_k$, but for tracking, the modeled clock error will be used in the place of $t_k$.

Figure 2:
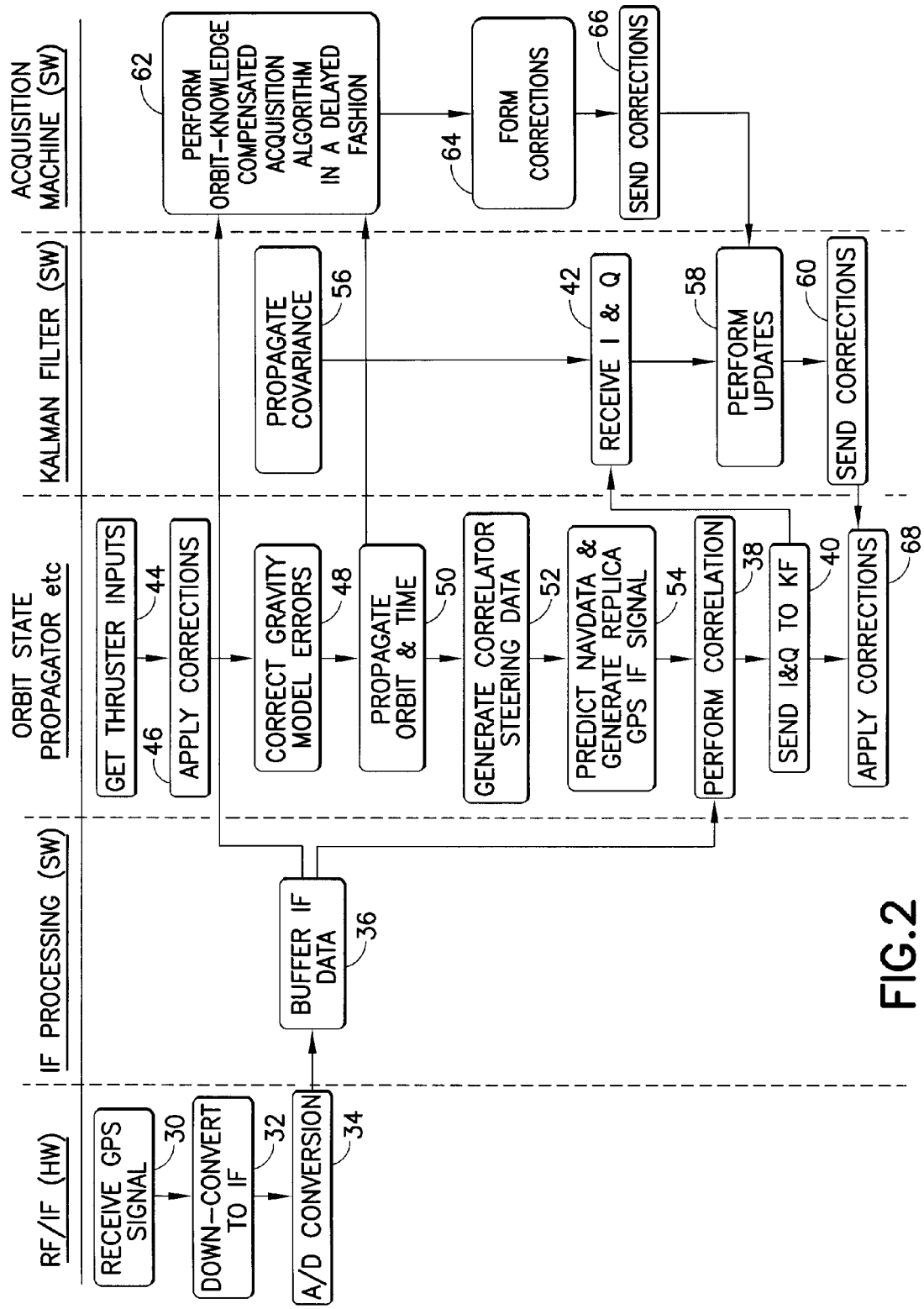
FIG. 2 is a flowchart showing steps of a method for determining a spacecraft orbit using GPS signals in accordance with the embodiment disclosed herein. The acronyms "HW" and "SW" respectively stand for hardware and software.

FIG. 2 is a flowchart showing steps of a method for determining a spacecraft orbit using GPS signals in accordance with the embodiment disclosed herein. The acronyms "HW" and "SW" respectively stand for hardware and software.

Referring to FIG. 2, in step 30 analog GPS signals are received by front-end hardware (previously described). The front-end hardware takes the L-band GPS signal and down converts the carrier frequency to the IF band in step 32. It then converts the analog signal into a sequence of digital samples in step 34. The resulting digital data is then stored in a buffer (step 36). As seen in FIG. 2, the buffered IF data is used in step 36 (i.e., correlation) or in step 62 (i.e., acquisition), which steps will be described hereinafter in more detail.

In step 44, the orbit propagator receives data representing the acceleration generated by thruster firings. In step 46, corrections are applied using the thruster error model, which corrections compensate for the differences between intended thruster force and actual thruster force. In step 48, the orbit propagator corrects for gravity model errors, based on gravity model parameter errors received from the Kalman filter.

In step 50, the orbit propagator propagates orbit and time. As used herein, the term "propagate orbit and time" means to numerically integrate gravity and thruster firing acceleration into velocity and position and update the time as time moves forward. This process is well known in the art. In the delayed-processing mode, the orbit propagator sends the current estimated velocity and position of the user satellite to the acquisition machine.

In step 52, the correlator steering algorithm generates correlator steering data. As used herein, the term "generate correlator steering data" means to predict the carrier intermediate frequency, code frequency and code phase and use the results to decide how to change the estimated carrier intermediate frequency, code frequency and code phase so that the replica signal matches with the incoming GPS signal. Specifically, the correlator steering algorithm simply predicts the carrier intermediate frequency, code frequency and code phase using the currently estimated position and velocity from the orbit propagator, and the clock bias, clock rate, and "integer ambiguity" from the Kalman filter as the first step.

In step 54, the replica signal is generated by using the predicted carrier intermediate frequency, code frequency and code phase, predicted clock bias and clock rate error and the predicted integer ambiguity. In addition, the replica signal is modulated with the navigation data information, which is based on current knowledge of navigation data, to allow extended coherent integration. Navdata contains both data that is predictable and data that is unpredictable. The ephemeris data bits, for example, will not be predictable, but some of the timing data is predictable by simply using the current time knowledge possessed by the system. Prediction is used when the unpredictable data is not changing and the predictable data is changing.

In step 38, the buffered signal data undergoes correlation processing. The resulting I and G signal components are sent to the Kalman filter (step 40). In step 56, the Kalman filter propagates the covariance to provide an estimate of the accuracy of the orbit prediction. Upon receipt of the I and Q signal components (step 42), the Kalman filter performs updates in step 58 and sends orbit state corrections to the orbit propagator (step 60). The orbit propagator applies these corrections in step 68. More specifically, the orbit propagator applies the corrections to the position and velocity vector states as estimated by the Kalman filter by simply adding the correction vector from the Kalman filter to the position and velocity vector states.

Still referring to FIG. 2, in the delayed-processing mode the acquisition machine (block 20 in FIG. 1) receives a train of GPS signal data from buffer 6. The acquisition algorithm coherently integrates the data from buffer 6 and also determines pseudo-ranges and pseudo-range rates by searching within the range of uncertainty against the received GPS signal (step 62). The orbit propagator provides orbit information to the correlator steering algorithm of the acquisition machine (step 50), which is used by the latter to provide the "center point" for the search range during acquisition searches. In step 64, the acquisition machine calculates corrections that will then be propagated from the time for which the correction is valid to the time when the correction will be applied by the orbit propagator in step 68—in most cases, keeping the velocity correction the same, and changing the position correction by adding the position correction and the velocity correction times the time difference between the time for which the correction is valid and the time when the correction is applied. The acquisition machine then sends those corrections to the Kalman filter. The orbit propagator applies corrections received from the Kalman filter in step 68.

The above-described system provides an autonomous orbit determination capability for GEO and HEO spacecraft. The system uses software to eliminate the need for space-qualified GPS receiver hardware. Using coherent integration, which is easily implemented in the software receiver, the system detects, acquires and tracks the very weak GPS signals at high altitudes. For high-altitude spacecraft, the system need not be concerned with ionosphere delays and troposphere delays and can easily eliminate the signals that go through the ionosphere and troposphere near Earth.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

APPENDIX

1. Correlator Steering Algorithm

At least two variations of the steering algorithm can be used in the overall architecture. The first variation implements a code phase and frequency tracking loop where the carrier frequency, code frequency and code phase command is computed using the following equations:

$$\omega_j = \frac{\vec{V}_{sat} \cdot \vec{V}_{GNSS} f_{carrier}}{c} + f_{IF} + f_j$$

$$\varpi_j = \frac{\vec{V}_{sat} \cdot \vec{V}_{GNSS} f_{code}}{c} + f_{code}$$

$$\phi_k = \left(\frac{|\vec{P}_{sat} \cdot \vec{P}_{GNSS}|}{c} + \delta t_{GNSS}\right) f_{code} + f_{code} t_k$$

The second variation implements a code phase and carrier phase tracking loop where the code phase and carrier-phase command is computed using the following equations:

$$\phi_k = \left(\frac{|\vec{P}_{sat} \cdot \vec{P}_{GNSS}|}{c} + \delta t_{GNSS}\right) f_{code} + f_{code} t_k$$

$$\phi_k = \left(\frac{|\vec{P}_{sat} \cdot \vec{P}_{GNSS}| + N\lambda}{c} + \delta t_{GNSS}\right) f_{code} + f_{code} t_k$$

where $f_{code}$ is the PRN code frequency; $f_{carrier}$ is the carrier frequency; $\lambda$ is the carrier wave length; $f_{IF}$ is the intermediate frequency; $f_j$ is the search frequency array; $t_k$ is the search time array; $\vec{V}_{sat}$ is the satellite (user) velocity vector; $\vec{V}_{GNSS}$ is the GNSS satellite velocity vector; $\vec{P}_{sat}$ is the satellite (user) position vector; $\vec{P}_{GNSS}$ is the GNSS satellite position vector; and $\delta t_{GNSS}$ is the GNSS satellite clock error. $\vec{V}_{GNSS}$, $\vec{P}_{GNSS}$ and $\delta t_{GNSS}$ are taken from the navigation message. The $f_j$ and $t_k$ are set depending on the size of the sample buffer and the accuracy of the time estimate.

2. Correlation Processing

The equations for the correlation processing are as follows:

$$I_{j,k} = \sum_{n=0}^{nsamp} V_n \sin(\omega_j t_n) prn(\varpi_j t_n + \phi_k) D(t_n)$$

$$Q_{j,k} = \sum_{n=0}^{nsamp} V_n \cos(\omega_j t_n) prn(\varpi_j t_n + \phi_k) D(t_n)$$

where $V_n$ is the digitized voltage of sample n; $t_n$ is the sample time; Dt is the coherent integration time; $n_{samp}$ is the number of samples to integrate over (i.e., Dt times the sample rate); $D(t_n)$ is the data bit phase at the sample time; $I_{j,k}$ is the in-phase correlation value; and $Q_{j,k}$ is the quadrature correlation value.

3. Clock Error Model

Given the periodic Sun exposure of the spacecraft in a regular fashion, the clock errors typically exhibit periodic behavior as well. Modeling of the clock errors using a periodic function corresponding to the periodic thermal profile of the spacecraft is referred to herein as "thermal modeling". This allows one to achieve better performance by taking advantage of this fact.

Specifically, the following thermal model is used in the disclosed embodiment:

$$\dot{\tau} = \xi^T(\Omega t)\eta + W_\tau$$

$$\dot{\eta} = W_\eta$$

ne: number of parameters used to model clock rate

η: ne×1 vector, parameters in the clock rate model, $W_\eta$: white noise, models the variation of the parameters $\xi^T(\Omega t)$: a set of period base functions For example, the periodic base functions may be Fourier base functions of sin and cos functions with the frequency being an integer multiple of $\Omega$. When only a single function "1" is used in the set, η degrades to the traditional clock rate.

4. Thruster Error Model

The relation between the intended thruster force and the actual thruster force is what the thruster model attempts to model. The specific forms of model depend on the actual thrusters, but one can use the following generic mathematical form to encompass most possibilities:

$$\text{Acceleration}_{generated} = f(\text{Acceleration}_{intended}, \beta)$$

where β is a vector of parameters.

5. Kalman Filter Model

Let the thruster force model be given by $\alpha_{generated} = f(\alpha_{intended}, \beta)$, β is a vector of parameters which may be uncertain for the thruster model.

Let the gravity model be given by $g=g(\gamma, R)$, where R is the position vector and γ is a vector of parameters used in the gravity model that may carry errors.

The state transition equations for the Kalman filter can be written as:

$$\begin{bmatrix} \dot{R} \\ \dot{V} \\ \dot{\beta} \\ \dot{\gamma} \\ \dot{\tau} \\ \dot{\eta} \\ \dot{N} \end{bmatrix} = \begin{bmatrix} V \\ g(\gamma, R) + f(t, \beta, \text{on}) \\ W_\beta \\ W_\gamma \\ \eta + W_\tau \\ W_\eta \\ W_N \end{bmatrix}$$

The state transition equation can be linearized as:

$$\begin{bmatrix} \delta\dot{R} \\ \delta\dot{V} \\ \delta\dot{\beta} \\ \delta\dot{\gamma} \\ \delta\dot{\tau} \\ \delta\dot{\eta} \\ \delta\dot{N} \end{bmatrix} = \begin{bmatrix} 0_{3\times 3} & I_{3\times 3} & 0_{3\times nb} & 0_{3\times ng} & 0_{3\times 1} & 0_{3\times 1} & 0_{3\times nsv} \\ \frac{\partial g}{\partial R} & 0_{3\times 3} & \frac{\partial f}{\partial \beta} & \frac{\partial g}{\partial \gamma} & 0_{3\times 1} & 0_{3\times 1} & 0_{3\times nsv} \\ 0_{nb\times 3} & 0_{ng\times 3} & 0_{nb\times nb} & 0_{nb\times ng} & 0_{nb\times 1} & 0_{nb\times 1} & 0_{nb\times nsv} \\ 0_{ng\times 3} & 0_{ng\times 3} & 0_{ng\times nb} & 0_{ng\times ng} & 0_{ng\times 1} & 0_{ng\times 1} & 0_{ng\times nsv} \\ 0_{1\times 3} & 0_{1\times 3} & 0_{1\times nb} & 0_{1\times ng} & 0_{1\times 1} & \xi^T(\Omega t) & 0_{1=nsv} \\ 0_{nc\times 3} & 0_{nc\times 3} & 0_{nc\times nb} & 0_{nc\times ng} & 0_{nc\times 1} & 0_{nc\times ng} & 0_{nc\times nsv} \\ 0_{nsv\times 3} & 0_{nsv\times 3} & 0_{nsv\times nb} & 0_{nsv\times ng} & 0_{nsv\times 1} & 0_{nsv\times nsv} & 0_{nsv\times nsv} \end{bmatrix} \begin{bmatrix} \delta R \\ \delta V \\ \delta \beta \\ \delta \gamma \\ \delta \tau \\ \delta \eta \\ \delta N \end{bmatrix} + \begin{bmatrix} W_R \\ W_V \\ W_\beta \\ W_\gamma \\ W_\tau \\ W_\eta \\ W_N \end{bmatrix}$$

which is used in the standard Kalman filter equations for covariance propagation. The equation parameters are as follows:

nsv=number of GPS satellites tracked; ng=number of gravity model parameters;

nb=number of thruster model parameters; R=3×1 position vector;

$W_R$, white noise also 3×1, models the numerical error of the integration on R;

V: 3×1 velocity vector; $W_V$, white noise also 3×1, models all the unmodeled acceleration errors;

β: nb×1 thruster model parameter vector; $W_\beta$, white noise also nb×1, models the variation of β;

γ: ng×1 gravity model parameter vector; $W_\gamma$, white noise also ng×1, models the variation of γ;

τ: scalar: receiver clock bias; $W_\tau$, white noise also scalar, models clock phase noise;

η: ne×1 vector, clock rate error parameters; $W_\eta$, white noise vector, models parameter variations;

N: nsv×1 carrier phase integer cycle ambiguity scaled into meters;

$W_N$, white noise also nsv×1, models numerical errors.

Two types of measurements can be used. The I and Q signal components can be passed through a discriminator, consequently deriving the pseudo-range and carrier-phase measurements from the I and Q components. Alternatively, one can use the I and Q components directly as the measurements.

When pseudo-range and carrier-phase are used, the measure-ment equations for GPS satellite k are simply:

$$PR_k = \|R - R_k\| + c\tau + V_k^{PR}$$

$$CP_k = \|R - R_k\| + c\tau + N + V_k^{CP}$$

where $V_k^{PR}$ is the code phase noise and $V_k^{CP}$ is the carrier phase noise.

When the I and Q components are used directly as the measurements, the relationship between pseudo-range, pseudo-range rate and carrier-phase is known and can be found in text books such as "Principles of GNSS, Inertial and Multisensor Integrated Navigation System" by Paul Groves:

$$IQ_k = IQ_k(pr_k, prrate_k, cp_k) + V_k^{IQ}$$

where $pr_k(R, \tau) = \|R - R_k\| + c\tau$ is the pseudo range $prrate_k(\dot{R}, \eta) = \|\dot{R} - \dot{R}_k\| + c\eta$ is the pseudo range rate $cp_k(R, \tau, \tau) = \|R - R_k\| + c\tau + N$ is the carrier phase Note that N is measured in meters, not cycles, in the above equations. Standard Kalman filter equations can then be applied.

The invention claimed is:

1. A Global Navigation Satellite System (GNSS) receiver onboard a satellite, comprising:

an antenna for generating analog Global Positioning System (GPS) signal data in response to detection of analog GPS signals;

front-end circuitry connected to receive said analog GPS signal data from said antenna, said front-end circuitry comprising an analog-to digital converter which converts analog GPS signal data to digital GPS signal data; and a computer processor programmed to perform the following steps:

(a) buffering digital GPS signal data outputted by said front-end circuitry over a time interval that is greater than the duration of a bit of a navigation message;

(b) calculating a respective set of parameters based in part on the digital GPS signal data remaining after navigation data wipe-out for each frequency/time data point in a search array, and based in part on modeled clock errors calculated by using a periodic function corresponding to a periodic thermal profile of said satellite to model clock errors;
(c) calculating time-domain averaged I and Q signal components as a function of said respective set of parameters for each frequency/time data point in said search array;
(d) calculating respective correlation magnitudes based on said time-domain averaged I and Q signal components for each frequency/time data point in said search array; and
(e) determining an orbit state correction based in part on said correlation magnitudes.

2. The receiver as recited in claim 1, wherein said set of parameters comprises predicted carrier intermediate frequency.

3. The receiver as recited in claim 1, wherein said set of parameters comprises predicted code frequency.

4. The receiver as recited in claim 1, wherein said set of parameters comprises predicted code phase.

5. The receiver as recited in claim 1, wherein said time interval is on the order of one second.

6. The receiver as recited in claim 1, wherein said computer processor is further programmed to perform the steps of propagating orbit state data of said satellite during said time interval and then buffering said orbit state data propagated during said time interval, and said respective set of parameters are calculated in step (b) based in part on said buffered orbit state data.

7. The receiver as recited in claim 1, wherein said computer processor is further programmed to perform the step of estimating corrections for the clock error model and a thruster error model.

8. A method of acquiring weak Global Positioning System (GPS) signals onboard a satellite orbiting at high altitudes, comprising the following steps:
(a) generating analog GPS signal data in response to detection of analog GPS signals;
(b) converting said analog GPS signal data to digital GPS signal data;
(c) buffering said digital GPS signal data over a time interval that is greater than the duration of a bit of a navigation message;
(d) calculating a respective set of parameters based in part on the digital GPS signal data remaining after navigation data wipe-out for each frequency/time data point in a search array, and based in part on modeled clock errors calculated by using a periodic function corresponding to a periodic thermal profile of said satellite to model clock errors;
(e) calculating time-domain averaged I and Q signal components as a function of said respective set of parameters for each frequency/time data point in said search array;
(f) calculating respective correlation magnitudes based on said time-domain averaged I and Q signal components for each frequency/time data point in said search array; and
(g) determining an orbit state correction based in part on said correlation magnitudes.

9. The method as recited in claim 8, wherein said set of parameters comprises predicted carrier intermediate frequency.

10. The method as recited in claim 8, wherein said set of parameters comprises predicted code frequency.

11. The method as recited in claim 8, wherein said set of parameters comprises predicted code phase.

12. The method as recited in claim 8, wherein said time interval is on the order of one second.

13. The method as recited in claim 8, further comprising the steps of propagating orbit state data of said satellite during said time interval and then buffering said orbit state data propagated during said time interval, said respective set of parameters being calculated in step (d) based in part on said buffered orbit state data.

14. The method as recited in claim 8, further comprising the step of estimating corrections for the clock error model and a thruster error model.

15. A Global Navigation Satellite System (GNSS) receiver, comprising:
front-end circuitry operable to generate digital GPS signal data from received analog GPS signal data; and
a computer processor programmed to perform the following steps:
(a) buffering digital GPS signal data outputted by said front-end circuitry over a time interval that is greater than the duration of a bit of a navigation message;
(b) propagating orbit state data of a satellite during said time interval;
(c) buffering said orbit state data propagated during said time interval;
(d) calculating a respective set of parameters for each frequency/time data point in a search array, the values of said parameters being based in part on position and velocity data included in said buffered orbit state data and based in part on GNSS satellite position and velocity data derived from a navigation message received from a source other than said detected analog GPS signals;
(e) calculating time-domain averaged I and Q signal components as a function of said respective set of parameters for each frequency/time data point in said search array;
(f) calculating respective correlation magnitudes based on said time-domain averaged I and Q signal components for each frequency/time data point in said search array; and
(g) determining an orbit state correction based in part on said correlation magnitudes;
wherein steps (d)-(g) are performed in real time during real-time mode and performed in a long delayed manner, segment-by-segment, during a delayed processing mode.

16. The receiver as recited in claim 15, wherein said set of parameters comprises predicted carrier intermediate frequency, predicted code frequency and predicted code phase.

17. The receiver as recited in claim 15, wherein said computer processor is further programmed to perform the step of using a periodic function corresponding to a periodic thermal profile of said satellite to model clock errors, and said respective set of parameters are calculated in step (d) based in part on said modeled clock errors.

18. The receiver as recited in claim 15 wherein said computer processor is further programmed to perform the step of estimating corrections for the clock error model and a thruster error model.

19. The receiver as recited in claim 15, wherein:
the controller is programmed to enter the delayed-processing mode before a GPS signal is acquired, and to enter real-time mode after the GPS signal is acquired.

20. The receiver as recited in claim 15, wherein:
the orbit state data buffered in step (c) is buffered with time stamps to allow time-matched processing together with the GPS signal data buffered in step (a) during the delayed-processing mode.

21. The receiver as recited in claim 15, wherein:
the orbit state correction determined in step (g) is propagated from a time for which the correction is valid to a time when the correction is applied;
at the time when the correction is applied, the correction is sent to a Kalman filter, and the corrections received from the Kalman filter are applied.

22. A receiver, comprising:
front-end circuitry operable to generate digital Global Positioning System (GPS) signal data from a received analog GPS signal; and
a computer processor programmed to:
  (a) calculate a respective set of parameters based in part on the digital GPS signal data for each frequency/time data point in a search array, and based in part on modeled clock errors calculated by using a periodic function corresponding to a periodic thermal profile of a satellite to model clock errors;
  (b) calculate time-domain averaged I and Q signal components as a function of said respective set of parameters for each frequency/time data point in said search array;
  (c) calculate respective correlation magnitudes based on said time- domain averaged I and Q signal components for each frequency/time data point in said search array; and
  (d) determine an orbit state correction based in part on said correlation magnitudes.

* * * * *